A. ARNOLD.
Case for Tea Pots.
No. 89,114.
Patented April 20, 1869.
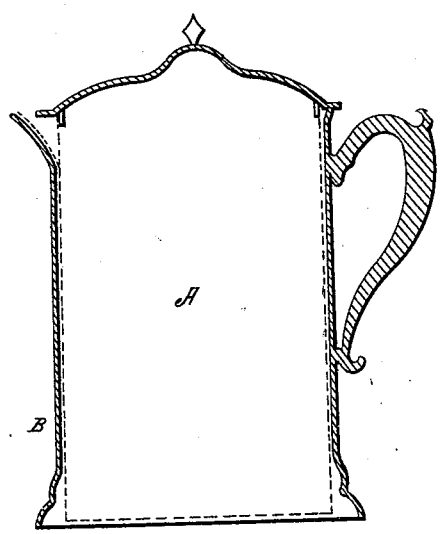
Witnesses:
Henry Stanton
H. B. Stanton
Inventor:
Alfred Arnold.

ALFRED ARNOLD, OF TENAFLY NEW JERSEY.

Letters Patent No. 89,114, dated April 20, 1869.

IMPROVEMENT IN JACKET, OR CASE FOR TEAPOTS.

The Schedule referred to in these Letters Patent and making part of the same.

*To all whom it may concern:*

Be it known that I, ALFRED ARNOLD, of Tenafly, Bergen county, and State of New Jersey, have invented a new and useful "Article of Table-Furniture;" and I do hereby declare that the following is a full and exact description thereof, reference being had to the accompanying drawing and letters of reference marked thereon.

There are two distinct classes of tea and coffee-pots, the one used as decocters, the other as receivers and dispensers of the beverage; the former are plain kitchen-utensils, the latter are ornamental pieces of table-furniture.

It is so desirable to have the decoction come on to the table hot, that many persons dispense with the use of the latter vessel, rather than cool the beverage by pouring it into it.

My invention is a substitute for the latter pot or urn, and consists of an ornamental, removable case, or shell, in which the decocter may be enclosed after the decoction is made, thus adapting it to table use, and retaining the heat of the beverage.

This case, or shell may be made of solid or of open work, with interstices so small as to conceal the general appearance of the decocter, and of such variety of styles as may suggest themselves to the tasteful artisan or designer.

A, shown in the drawing by dotted lines, is the decocter.

B is a vertical section of said case, or shell, enclosing A. It has a cover, but no bottom.

In this instance A has no handle, and has a pitcher-nose instead of spout, so that B is made in one piece, and admits A to be conveniently placed therein and removed therefrom.

But if it be desired to enclose a decocter having handle and spout, then B may be made in half-sections, joined on opposite sides, (where the spout and handle are located,) the edges nicely fitted to each other, and held together by spring-catches or other known devices suitable for the purpose.

When applied to urns, the spirit-lamp may be dispensed with, as but little heat will be radiated.

What I claim as my invention, and desire to secure by Letters Patent, is—

The "article of table-furniture," herein described, as a new article of manufacture.

ALFRED ARNOLD.

Witnesses:
HENRY STANTON,
H. B. STANTON.